United States Patent [19]

Hutchings et al.

[11] Patent Number: 5,127,182
[45] Date of Patent: Jul. 7, 1992

[54] PIVOTURED FISHING POLE HANDLE

[76] Inventors: David R. Hutchings, 12705 Bullick Hollow, Austin, Tex. 78726; Marcos E. Gonzalez, 1904 Newton, Apt. B, Austin, Tex. 78704

[21] Appl. No.: 608,706
[22] Filed: Nov. 5, 1990
[51] Int. Cl.⁵ .......................................... A01K 97/00
[52] U.S. Cl. ......................................... 43/25; 43/18.1; 43/22
[58] Field of Search ................... 43/22, 23, 25, 18.1

[56] References Cited

U.S. PATENT DOCUMENTS

| | | | |
|---|---|---|---|
| 1,321,841 | 11/1919 | Otto | 43/22 |
| 1,927,576 | 9/1933 | Smith | 43/25 |
| 2,149,837 | 3/1939 | Browne | 43/23 |
| 2,804,711 | 9/1957 | Kozar | 43/25 |
| 2,843,963 | 7/1958 | Butehorn | 43/25 |
| 3,309,810 | 3/1967 | Hannon | 43/25 |
| 3,419,992 | 1/1969 | Strahm | 43/22 |
| 3,643,367 | 2/1972 | Denny | 43/25 |
| 3,744,173 | 7/1973 | Puyear | 43/22 |
| 4,051,617 | 10/1977 | Dorph | 43/18.1 |
| 4,539,773 | 9/1985 | Eldridge | 43/25 |
| 4,656,773 | 4/1987 | Klefbeck | 43/18.1 |
| 4,845,879 | 7/1989 | Urso | 43/18.1 |

Primary Examiner—Kurt Rowan

[57] ABSTRACT

A handle apparatus for a fishing pole is depended thereto by a pivoture of limited range being inertially reactive in ordinary use. The reaction coordinatedly levers a triggerhorn feature against and back from an ordinary "spin-casting" type reel, eliminating nuisance control efforts otherwise required of the user's thumb and without creating any alternative nuisance tasks. An intermedial shoe comprises economical retro-fitting or mounting adaptation means toward previously existing poles which have more or less generic, rearend shanks, normally outfitted by but deposeable of common handlegrip articles. A similarly dimensioned shank termination of the new handle apparatus is for outfitting by any appropriate or deposed handlegrip.

4 Claims, 1 Drawing Sheet

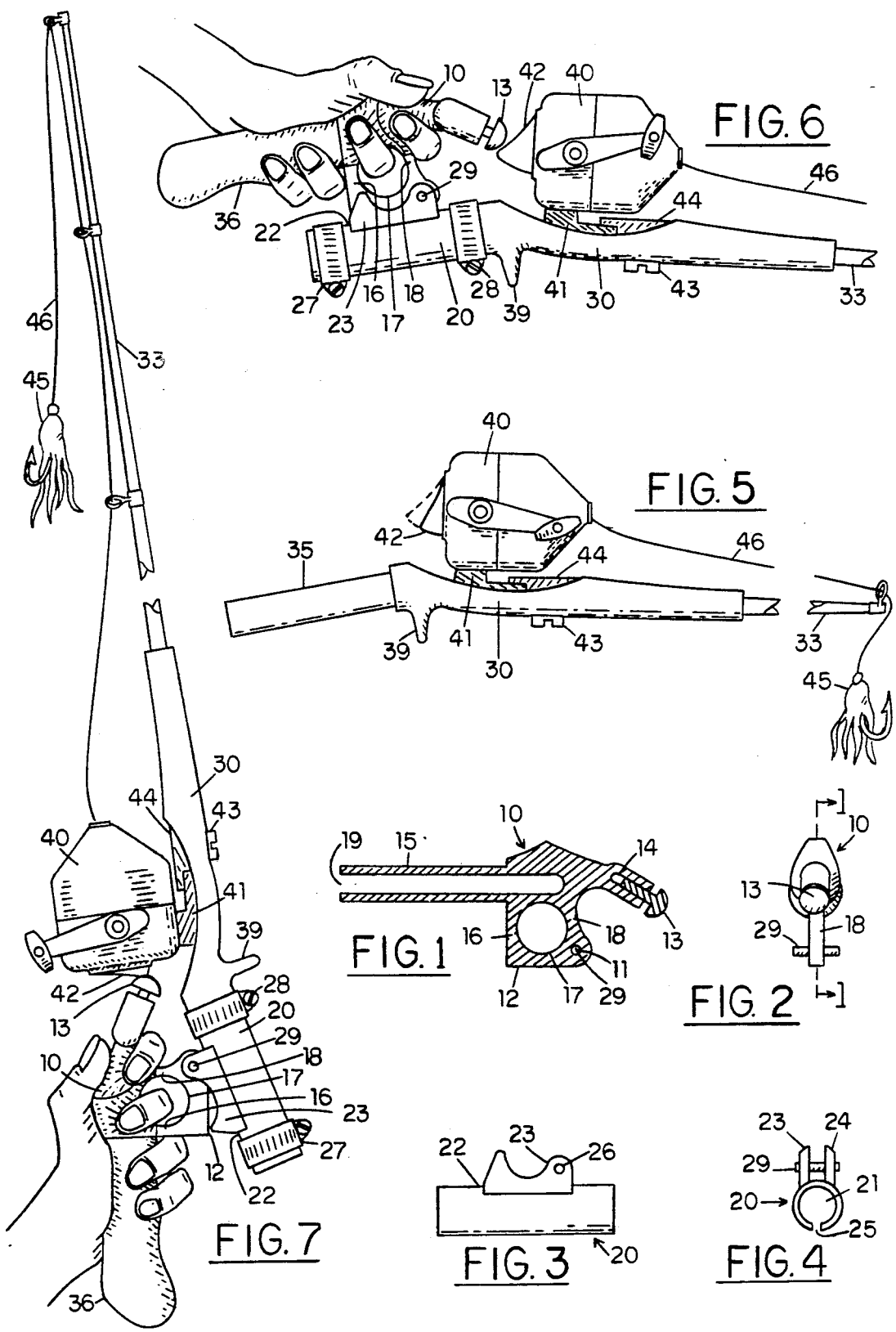

PIVOTURED FISHING POLE HANDLE

BACKGROUND OF THE INVENTION

This invention relates to "automaticizing" inventions and improvements in the casting of fishing pole tackleline, relating especially to fishing poles outfitted or able to be outfitted with commonly made, merchandised, and recognized tackleline reeling devices (especially and referably, "spin-casting reels") which require the user to put forth some coordinated thumb effort with every casting motion.

Spin-casting reels typically will have a rearwardly directed "thumb trigger" and sidewardly extended crankhandle (normally out of the right side). A more thorough discussion of the common spin-cast design and componentry must follow to familiarize the reader to the purpose and naming of the many and various items herein, and critical observations are also articulated concerning use of (as commonly endured) the spin cast design.

In pressing the thumb trigger, the user FIRST actuates disengagement of a spool winding mechanism. The line is thereby momentarily free to unspool. Excessive unspooling threatens to abort the potential line and tackle cast, if the moment of freedom should for any reason prevail over the manufacturer's design intention and ability to cut it short. Immediately NEXT then, IF the user continues to press firmly, needed brakement of the line will also occur as further protraction of the spool soon pinches the line against a surrounding containment canister. With adequate brakement, acceleration of the tackle by user whipstroking is possible. NEXT, perfect casting releasement occurs only with quick retraction of the spool back from pinching the line against the canister at just the right moment—requiring coordinated backward retraction of the thumb off of the thumb trigger at a critical point while the angler's arm is thrusting forward and the angler's wrist is forcively pivoting forward in the effort of accelerating the tackle—IF nothing goes wrong and the user is adept with casting. Learners unanimously disdain the unnatural, distorting demands (upon their normal thumb behavior) for strong grasping need simultaneously with thumb retraction. Also, learners often lack a sufficient mental image of a proper casting event in all its details to be able to approach success on their own with existing equipment.

Prior improvements and inventions (such as U.S. Pat. Nos. 3,296,732 or 3,436,858 or 4,051,617) have substantially failed to reduce user coordinated actions typically required and associated with the casting and reeling of fishing tackleline. Instead, while these approaches may have eliminated the aspect of critically timed coordination of thumb thrusting come thumb retracting combined with vigorous arm and forceful wrist movements, they have introduced the aspect of differing and/or additional distractive, nuisance actions (usually some precise line-placement task) to which the angler is subjected.

Most notably, the invention herein substantially obsoletes or surrogates the repetitious coordinated thumb efforts which are typically required of the user in the casting of the typical spin cast reel. This is accomplished "automatically" by an inertially active pivoture (of a depended member to a support body of a more or less typical fishing pole) and a harvesting of lever force therefrom to do the needed thumb trigger pressings and releasings.

Accordingly, we claim the following as objects and advantages of the invention: to provide means simplification about the activities to the users and newcomer users of fishing poles outfitted with ordinary spin cast reels, regardless of familiarity of users with existing schemes and activities pertaining to already existing devices and systems for the repetitious casting and reeling of fishing tackleline, regardless of personal ability, skill, or intelligence pertaining to any user, even in the case of where the user refrains from using previous existing devices because of a lack of thumb(s) or thumb dexterity; to provide a pivoture, pivotally depending a graspable, depended member (featuring a triggerhorn upon itself) to, upon, or about a support body as in a supportive, molded plastic body of a fishing pole, substantially pivotally responsive under forces of acceleration, thereupon benefiting and conducting a coordinated force to actuate or control operation or functions of a typical spin cast reel; to provide means of adapting exiting pole designs (where practical) to the invention and back again to provide at the same time a more securely graspable configuration of handle.

DRAWING FIGURES

FIG. 1 is a sectional view of the member of FIG. 2 after turning it 90 degrees about the vertical axis.

FIG. 2 is a front end elevational view of the toggling member with the toggle-pin installed.

FIG. 3 is an elevational view of the shank-mounting shoe, viewed from the right side.

FIG. 4 is an endwise elevational view (front end and rear end appearances more or less similar) of the shank-mounting shoe, with the toggle-pin installed.

FIG. 5 is an elevational view of the right side of a more or less typical fishing pole support body configuration (shown outfitted with spin-casting type of reel), cylindrical shank end bared to view. Flexible rod length greatly foreshortened for viewing convenience.

FIG. 6 is an elevational view of the right side of an assemblage of the toggling member, shank-mounting shoe, support body (flexible rod member substantially deleted for viewing convenience), and a handlegrip component, showing the condition of pivotation of the member and body to be dis-incidenting of the triggerhorn against the thumb trigger.

FIG. 7 is a similar view as FIG. 6, noting all is rotated counter-clockwise (about the pivoture axis) and the condition of pivotation appears fully incidenting of the triggerhorn against the thumb trigger. Flexible rod member length foreshortened to about half of typical, for viewing convenience.

DRAWING REFERENCE LETTERS AND NUMERALS 10 toggling member
11 hole for 29
12 erective lever-arm or stop-limit conformity of 10
13 triggerhorn
14 receptacle for 13
15 shank end of 10
16 rearweb
17 finger portal
18 forweb
19 core hollowing of 15
20 shank-mounting shoe
21 lengthwise bore 22 lever-arm or stop-limit conformity of 20
23 confinement wall
24 confinement wall
25 lengthwise slit
26 hole for 29
27 cinch-band
28 cinch-band
29 toggle-pin
30 support body
33 flexible rod extension
35 shank end of 30
36 molded polymer handlegrip
39 forefinger gaff
40 "spin-casting" reel
41 mounting foot
42 thumb trigger
43 threaded lug
44 nut
45 tackle, lure, or bait
46 tackleline

DESCRIPTION OF THE INVENTION

Of primary importance to this invention is the fact of the pivoture (assembled in FIGS. 6 and 7) of the toggling member 10, FIG. 1, with the support body 30, FIG. 5, accomplished herein by the toggle-pin 29 securely aligning all pivot holes (11, 26, found detailed in FIGS. 1 and 3). A simple press-fit of the pin to either pivot hole would prevent the pin from sliding out, as might other more involved approaches. With the pivoture so given, actuational "leverage of toggling" for automatic actuation of the casting reel is deriveable at a suitable lever-arm distance generally about the toggling axis. Herein, this actuative lever-arm is realized in the structurement of member 10 from the pivoture through the receptacle 14, terminated with the triggerhorn 13.

Member 20 is molded of a durable polymer material or otherwise suitably made, and is shown (FIGS. 1, 6, and 7) substantially manifolded for comfortable, secure grasping by hand. Additional comfort is gained having 10 outfitted over shank end 15 by the molded polymer handlegrip 36. Of course, the profile provided to member 10 by such an accessory article could be more or less accomplished in the original manufacturing of 10, but would thereby forsake any cushioning response characteristic of the more ideal (for handlegrip) polymers. Also, conservation of shank material is practical and represented in the substantially cylindrical core hollowing 19 of the shank.

The finger portal 17 allows optive finger engagement (i.e., first or second finger) between rearweb 16 and foreweb 18, substantially promoting securement of the user's hold (as was the design intention of the now absolete forefinger gaff 39, FIG. 5) and accommodating a wider hand to the often minimal length of the merchandised handlegrip. Other portal and structural web considerations and designs might benefit the grip as well, but the choice illustrated herein delivers important ridgidity to the lower extremity of 10 and provides suitable physical structure and positionment to the pivoture.

Exhibiting foremost upon member 10 and appearing to be a semi-spherically crowned bolt, triggerhorn 13 is replaceable or adjustable by screwing it in or out of bolt recepticle 14, should the need arise. Comparing FIGS. 6 and 7 views, the triggerhorn is seen to provide incidence and dis-incidence against the thumb trigger 42 of the spin-casting reel 40. Minor variations in previously manufactured equipment may be substantially compensated for by use of the adjustment. bringing the triggerhorn to meet with the thumb trigger more or less optimally. In use with the most common pole and reel combinations, the triggerhorn might be most simply made continuously molded of member 10.

Seen in FIGS. 1, 6, and 7, the erective lever-arm (or stop-limit) conformity of the toggling member (bottom edge/surface 12 of 10 at lowest extremity of web 16) is able to arm some minor amount about the pivoture when not contacting solidly against the opposing lever-arm (or stop-limit conformity) pertaining about the support body (this opposing conformity, 22, happens to be shown inclusively conformed of the topside of shoe 20, FIG. 3, where 12 would lay upon it). The solid opposition of these two lever-arms restricts pivoting of the member any further, and is durable enough together with the durable construction of the pivoture that the member will support the weight and various pullings (due to gravity, snags, aquatic inhabitants, etc.) upon the support body while keeping the triggerhorn at a proper readiness position (the dis-incidenting position) for automatic casting. By locating the pivoture to the lower extremity of the forweb and the erective lever-arm conformity to the lower extremity of the rearweb, the portal opening is more easily enabled an optimal size and shape while these various forces are incurred upon the structural webs substantially directly as straight tension and compression, thereby enabling the webs to be somewhat more streamlined and materially conserving than otherwise. The orientation of the user's hand in support of the affair is more or less similar while substantially elevated to what it would be otherwise without the invention (as illustrated) taking part. Importantly, the elevation, webs, and portal altogether provides room for the toggling member to be properly regardful toward the needs of the hand, while enabling other important considerations to be met more or less conveniently, as should become evident following discussion about the shank-mounting shoe.

The shank-mounting shoe 20, FIGS. 3 and 4, conforms substantially to mating upon the posterior shank end 35, FIG. 5, of the illustrated, previously manufactured support body, thereby adapting this prior art pole to the invention. By some way or another, the shoe is affixed ridgidly onto the shank end and stays in proper position during use, possibly adhered with a strong adhesive, clamped, cinched, screwed through or pinned through. Herein, the shoe is shown being more or less of cylindrical bore lengthwise (21) with a lengthwise slitting 25, whereby cinch-bands 27 and 28 (being of more screw-tightening design or otherwise) are able to cinch the relieved diameter tightly around 35. The amount of slitting could vary from one design to another (depending on incidental considerations) from none at all to well beyond halfway around 35, and the shape of the shoe might vary greatly in mating some particular shank end style. The pivoture location is also substantially non-critical, observing parameters dictated by the thumb trigger movement and the appropriate brakement pressure (i.e., leverage ratio), and could readily be either somewhat foreward, rearward, and/or below of the choice shown by hole 26. The confinement walls 23 and 24 are more or less optimally profiled to provide an exclusionary envelope against hazardous fingertip placements, into the scissoring pliers between the erective lever-arm and support body or shoe. Also, a workable pivot location using one long pin is thusly promoted, considering that lower pivot locations using one pin should probably penetrate (drilling required) the previously undrilled shanks of support bodies. Using two pins, in avoiding the drilling procedure, the structural envelopement of the pivot pins would likely require a thickening of material such as a "boss" area, permitting use of larger pins over tiny pins. Of course, if the pins are sturdily molded in polymer material integral with either participant of the pivoture, then separate pins of metal or otherwise are avoided.

Seemingly, many thousands of fishing poles are rearwardly terminated in a cylindrical shank (substantially alike, diameterally), overwhich shanks are adhered contoured, molded polymer handlegrip articles substantially equivalent to one another. Herein the handlegrip 36, FIGS. 6 and 7, is so typical, probably having been intended for permanent adhesion upon the shank of a support body (such as 35 of 30, FIG. 5) but is relocateable (probably to be affixed by an adhesive) to the shank end 15 of member 10.

Noteably, the shank-mounting shoe may be conveniently generic to a substantial number of exiting poles, and also allows the owner the option of changing his pole back again, such as when the choice of reel becomes other than a spin-casting type of reel. Alternatively, the support body may easily incorporate to itself any essential features necessary to eliminate the intermediary approach of the shoe, becoming a support body directly provided some pivoture means and some lever-arm (or stop-limit) design conformity means of which the shoe otherwise would provide. The views of FIGS. 6 and 7 serve to illustrate this anyway, albeit limitedly, since it could appear exactly the same (but would probably differ substantially) allowing for the unlikely presence of superfluous cinch bands and the now virtually useless forefinger gaff 39. More streamlined profilement of the invention thereafter could arive at a design which varies substantially little, but for a triggerhorn feature, from the appearance of the typical, unimproved pole handle.

Substantially, many commonly made and merchandised spin cast reels such as 40, FIG. 5, would agree at their bases (foot 41) to being held firmly immobile (usually confined in a conforming recess) by pressure from a threaded mounting lug and nut, 43 and 44. The support body is also structurally supportive at its forward end of flexible rod extension 33, the rod being most likely of fiber and resin construction for extreme strength with flexure. Substantial length and/or componentry of 33 is cut from illustration by the broken views in FIGS. 5-7 to conserve drawing space.

FIG. 7 illustrates the dynamically toggled condition of pivotation when the thumb trigger 42 of the reel is depressed by the triggerhorn 13 to the point of applying (internal) brakement upon the tackleline. Normally, this position occurs in use when the toggling member is held forced vertical or beyond with the support body tipped by gravity and inertia to be fully toggled with the member.

OPERATION OF THE INVENTION

The "Pivotured Fishing Pole Handle" invention takes advantage of the combined physical inertia of the pole and whatever accouterments and ready tackle to surrogate the actuational pressures normally provided by manual "thumb management" of "spin-casting" type reels. These reels are typically manufactured with a rearwardly directed "thumb trigger" for initiating dis-engagement of their (drag-clutched) winding mechanism, brakement of the free line, and releasement of the brakement. For some other designs of reels which have a spool exposed at the back of the reel (intentionally for control pressure by the user's thumb directly on the wound line), the invention herein would also serve to surrogate the thumb task without involving redesign of the reel itself. As well, most any existing reel design could be altered by its manufacturer to be internally actuated by the leverage of toggling of the invention.

By whatever accepted conventions of design, and due to the realities of the sport of fishing, the use of the abundant spin-cast reels requires repetitious depressing and releasing of their thumb triggers coordinately timed to the tackle-energizing swing of the fishing pole. This scheme is upheld by the invention herein which furthermore essentially preserves the experience of the sport as it is commonly enjoyed, introduces substantially no new nuisance tasks as do other inventions, yet benefits the angler or beginning angler newfound freedom from the act of "thumb managing" or dis-engagement, brakement, and releasement sequence as the tackle is energized in casting. The reeling-in procedure would be the same as otherwise, substantially uninvolved in conjunction with the invention.

It being the case that when the arm of the angler is swinging or thrusting in the act of casting the tackle off the whip-end of the held pole, the inertia of the pole and tackle will resist acceleration in the forward direction, generating the needed leverage of toggling and maintaining the pivotted response of the toggling member 10 with the support body 30 as shown in FIG. 7. This pivoting brings the triggerhorn 13 to depress the thumb trigger 42 of the tackleline reeling device 40, initiating design intents, these being, firstly, a necessary dis-engagement of the winding mechanisms within the reeling device which frees the line, and secondly, necessary brakement of the tackleline within the reeling device which prevents premature unwinding (due to tackle and/or bait weight) before the proper moment of casting. It being next the case that when the swung arm comes to rest or halt at the end of the angler's casting effort, the forward momentum of the pole will undo the previous pivoting, bringing the triggerhorn back off from the thumb trigger to thereby release the brakement of the line (by some spring action means within the reel). The apparatus is thereafter held (under balanced hand and gravity forces) to the condition of pivotation illustrated by FIG. 6, however, the thumb trigger will remain depressed to a middle position (middle position illustrated by the solid line of 42, FIG. 5) which provides for tackleline release. (Ordinarily with spin-casting reels, once the reel is cranked a bit, the thumb trigger resets immediately to the starting position.) The pivotal, inertial reactions take place substantially at the exact moments when the associated dis-engagement, brakement, and releasement are needed, automatically for the user. Accordingly, the material and dimensional construction of the pivoture should find it durably strong enough so to resist typical accidental forces which would otherwise be ruining to it.

The lever-arm/stop conformities or configurations herein are representative of the substantially various design approaches which might enter consideration or be readily designed for limiting the degrees of pivoting (in order than the improved fishing pole behaves properly and more or less similar to what an experienced angler would expect). Various considerations of design too lengthy to discuss herenow would influence any designers efforts to provide the best pivotal movement limiting means. Basically, however, the member should hold quite straight with the pole at all times other than during energization of the tackle for the cast, and should not allow downward collapse of the pole.

The toggle motion need be only enough to actuate the reel all the way into the braking mode and all the way back out through the release mode. This pivoting is slight enough that the user is not terminally distracted or hampered in the effort of casting and reeling, provided that the reel is maintained "topside" over the pole (never up-side down), during fishingactivity. Otherwise the pivotal reactions would also be opposite as intended by the invention, and the dis-engagement, brakement, and releasement of the tackleline can't be coordinated to the usual fishing effort.

Should it be that the spin-casting reel is replaced by the type of reel designed for thumb-pressure brakement directly upon the line winding spool, the invention disclosed herein is also substantially able to perform the thumb task, however, it may be necessary for a different triggerhorn to be installed in order to find the optimum dis-incidence configuration and incidence behavior.

The description is not intended to limit the scope of the invention, but to provide effective exemplifications of preferred embodiments thereof. Those skilled in the art will envision other variations within the scope of the claims. For example, it is obvious to us that the triggering means can be made more enclosed and protected within some shrouding conformity or other of the tackleline reeling device or of the support body. The reel body can be more or less molded continuous with the support body, eliminating other mounting considerations and approach. The thumb trigger and triggerhorn could then be altered or combined in some design or other for a more compact, enclosed mechanism acting between the depended member and the tackleline reeling device. In a converse approach, a cable or stiff link could be used for pulling at some different leverarm point below, behind, or forward of the pivot, conducting the leverage of toggling by tension rather than compression but nevertheless thereby controlling a properly modified tackleline reeling device during casting.

We claim:

1. A device for mounting on the support body of a fishing rod having a spin-casting reel with a thumb trigger comprising, a shank mounting shoe attached to the support body of said rod, a member pivotally mounted by a toggle pin to a forward portion of said shank mounting shoe, said member further comprising a handlegrip, said member having a triggerhorn attached to a forward portion of said member, said handle-grip and said triggerhorn are attached to opposite ends of said member such that said triggerhorn actuates said thumb trigger when the rod is cast by a user gripping the handlegrip of said member.

2. The device of claim 1, wherein said mounting shoe is clinchably mounted to said support body.

3. The device of claim 1, wherein said member further comprises a finger portal adjacent said toggle pin.

4. The device of claim 1, wherein said triggerhorn is adjustable.

* * * * *